United States Patent
Cooper

[15] 3,640,703
[45] Feb. 8, 1972

[54] CYCLIC INTEGRATED COPPER PROCESS

[72] Inventor: James R. Cooper, Douglas, Ariz.
[73] Assignee: Chemical Refiners, Inc.
[22] Filed: July 9, 1970
[21] Appl. No.: 53,561

[52] U.S. Cl. ................................75/101, 75/108, 75/115, 75/117
[51] Int. Cl. ........................................C22b 15/08
[58] Field of Search ..........................75/117, 101, 108, 115

[56] References Cited

UNITED STATES PATENTS

| | | | |
|---|---|---|---|
| 707,506 | 8/1902 | Ferraris | 75/115 |
| 740,701 | 10/1903 | Sebillot | 75/115 |
| 825,302 | 7/1906 | Cowing | 75/117 X |
| 1,076,833 | 10/1913 | Laist | 75/115 X |
| 1,101,115 | 6/1914 | Borchers et al. | 75/117 X |
| 2,805,936 | 9/1957 | Schaufelberger | 75/117 X |
| 3,241,950 | 3/1966 | Mackiw et al. | 75/117 |
| 3,293,027 | 12/1966 | Mackiw et al. | 75/119 |
| 3,529,957 | 9/1970 | Kunda et al. | 75/108 |
| 3,544,306 | 12/1970 | McGauley | 75/119 X |

Primary Examiner—L. Dewayne Rutledge
Assistant Examiner—G. T. Ozaki
Attorney—Drummond, Cahill & Phillips

[57] ABSTRACT

A cyclic integrated process for the production of copper metal is provided. In this process, copper ores or copper ore concentrates or, optionally, cement copper is converted to copper metal without the necessity for pyrometallurgical operations, thus entirely eliminating any air pollution problems. The source of copper values is taken into solution by leaching with a mineral acid such as sulfuric acid, converting the copper values to soluble copper salts. The pregnant liquor containing the soluble copper salts is treated with a precipitating gas such as hydrogen sulfide to precipitate the copper values as solid copper sulfide. The copper sulfide is dried and treated in a finely divided state with a reductant gas such as hydrogen, methane (either pure or contained in natural gas) or a reformed natural gas containing hydrogen and carbon monoxide. The byproduct gaseous hydrogen sulfide of the copper sulfide reduction step is recycled to precipitate more copper sulfide from the pregnant liquor. The mother liquor is treated to recover sulfuric acid which is optionally recycled to the pregnant liquor preparation step to dissolve more copper values.

3 Claims, 4 Drawing Figures

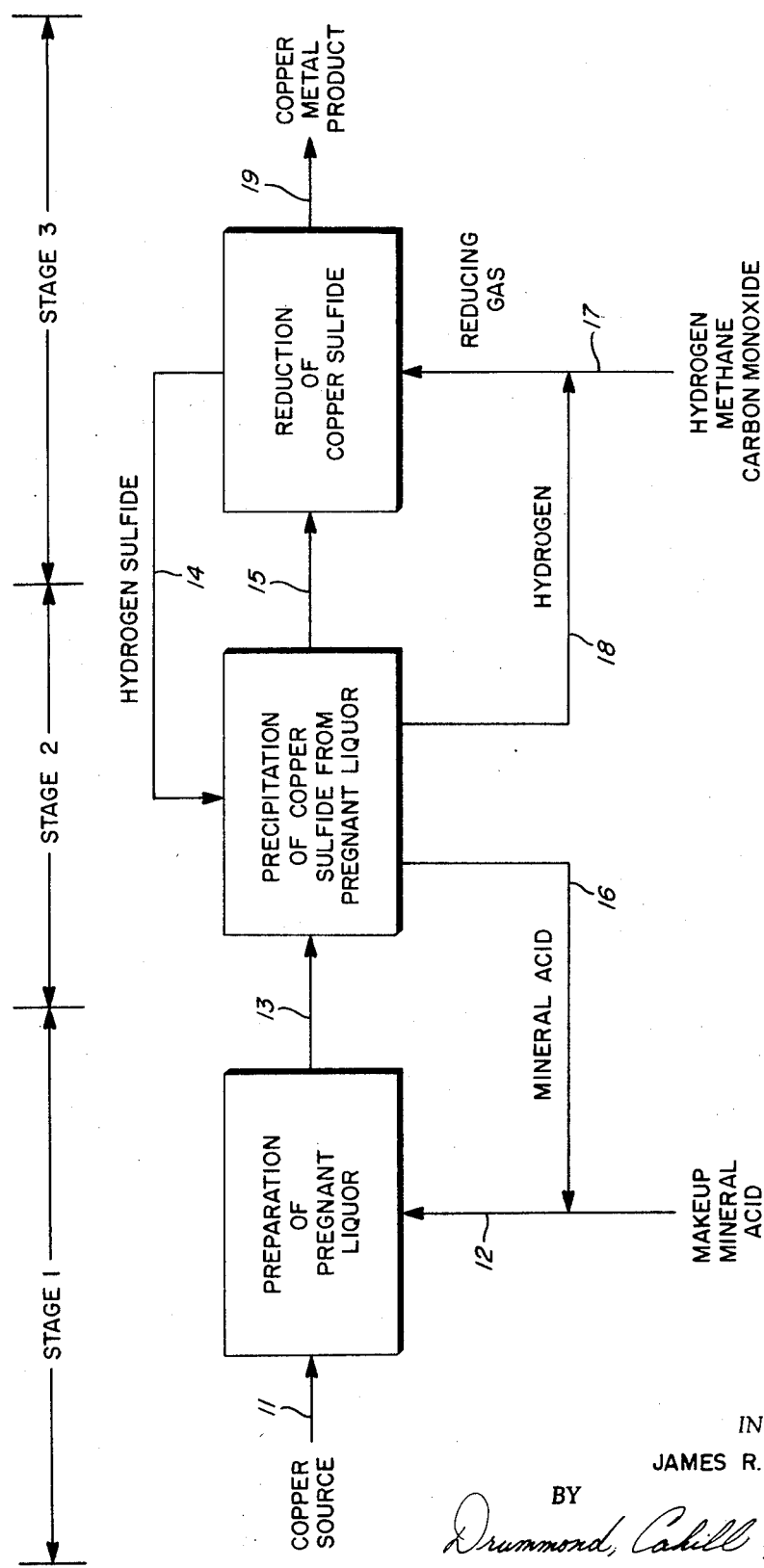

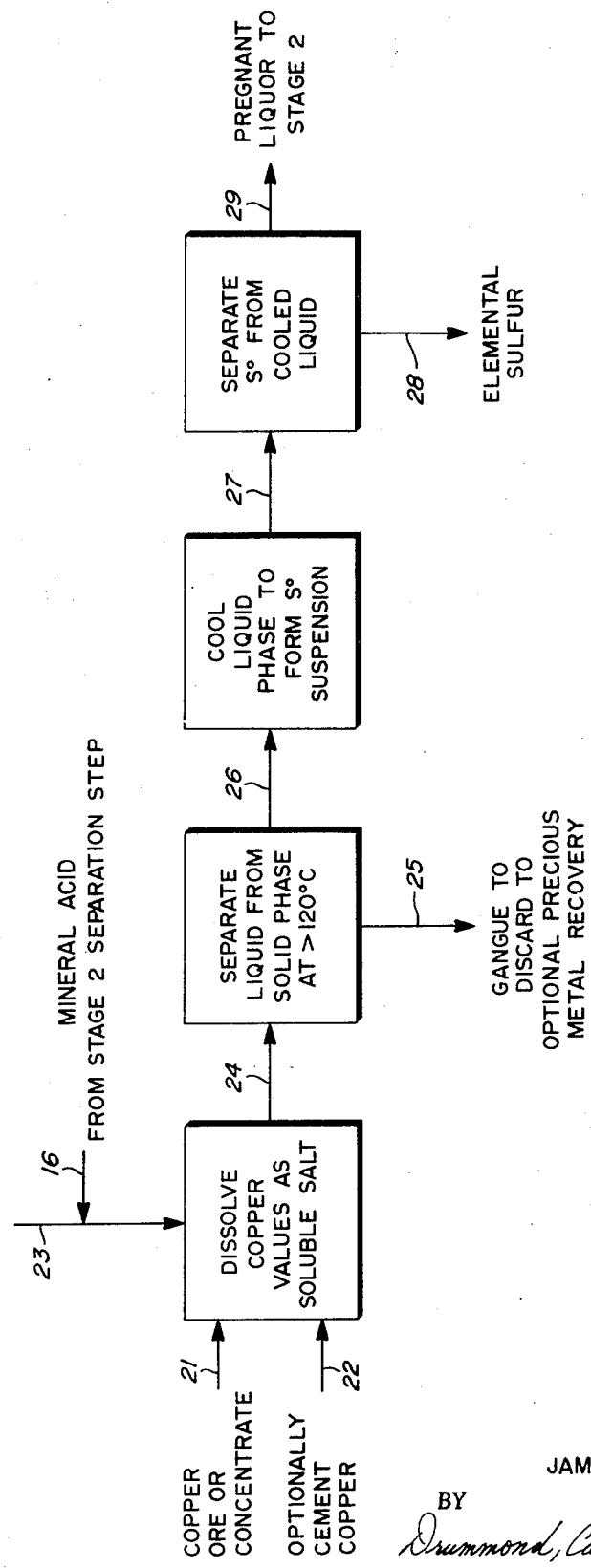

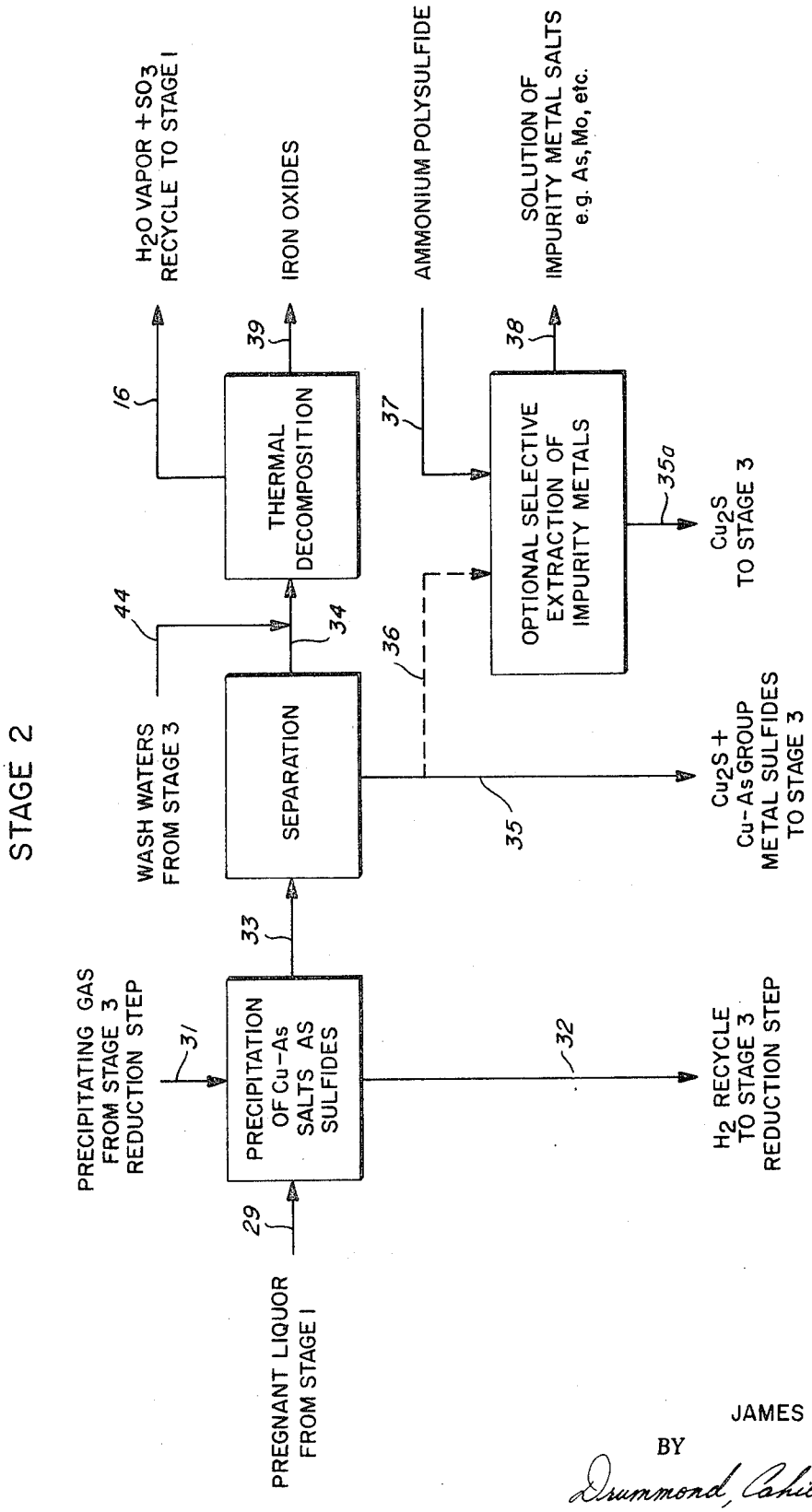

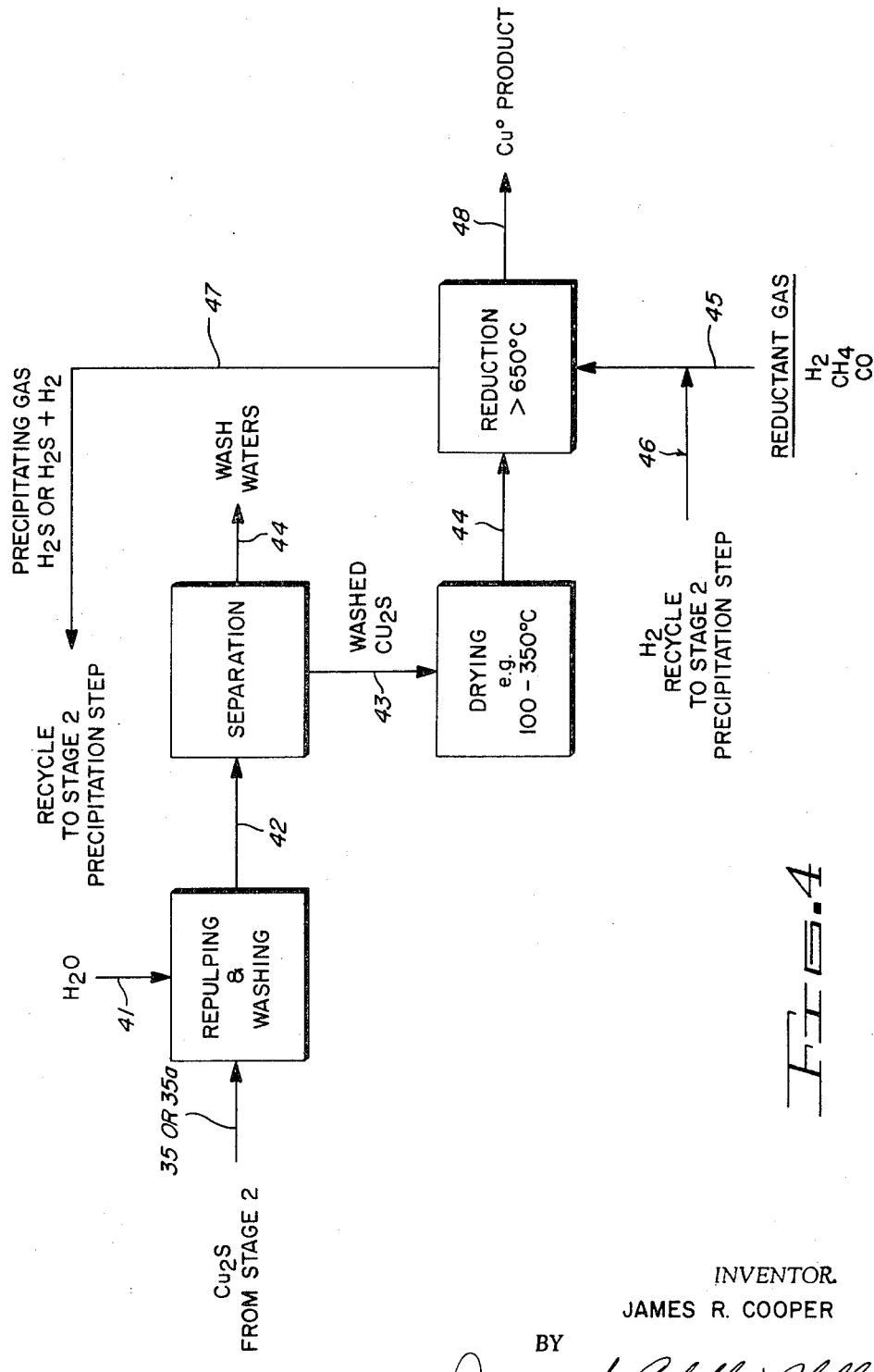

CYCLIC INTEGRATED COPPER PROCESS

This invention relates to a cyclic integrated process for the production of copper metal.

More particularly, the invention concerns a process for winning copper from its ores, ore concentrates or from cement copper without the necessity for pyrometallurgical operations, thereby eliminating air pollution problems.

In still another respect, the invention relates to a cyclic integrated copper production process in which a solution of copper values in the form of soluble copper salts of a mineral acid is treated with a precipitating gas to separate the copper values as in insoluble precipitate which is, in turn, reduced to copper metal by contact at an elevated temperature with a reductant gas.

In still another and further aspect, the invention relates to a process as described above in which the gaseous byproduct of the copper reduction step is recycled as the gas for precipitating more copper values from the pregnant liquor.

In still another and further aspect, the invention concerns a process in which the mother liquor from the precipitation step is treated to recover mineral acid which is recycled to dissolve more copper values in the pregnant liquor preparation step.

Finally, the invention provides a means for recovery of elemental sulfur from the copper-bearing sources.

In recent years, much emphasis has been placed upon the development of processes for the production of copper metals which do not involve pyrometallurgical operations. Such emphasis has stemmed from both the desire to avoid air pollution problems normally associated with pyrometallurgical operations and also from the desire to avoid the high capital investments normally required for pyrometallurgical production facilities. Additional impetus for the provision of a nonpyrometallurgical copper production process has been furnished by the desire to recover copper values from dilute solutions of soluble copper salts such as mine waters, mine waste dump leaching operations, etc.

However, because of high production costs normally encountered in nonpyrometallurgical processes, principally stemming from the cost of the chemical reagents employed, to date nearly all of the commercially available copper metal is produced by means of the conventional pyrometallurgical smelting process. This conventional process typically involves the preparation of a concentrate of the copper ore, smelting the concentrate in a reverberatory furnace to separate gangue materials from the concentrate, producing a copper sulfide-iron sulfide melt known as "matte," converting or "Bessemerizing" the matte to form an impure product known as "blister copper," refining the blister copper by air oxidation to remove final quantities of sulfur impurity, casting the refined copper into shaped anodes and, finally, electrolytically refining the anodes to form so-called "cathode" or "electrolytic" copper.

It would be highly desirable to provide a nonpyrometallurgical process for the production of copper metal in which the copper or copper ore concentrate or, optionally, cement copper could be converted directly to a copper metal product of acceptable commercial purity by means which entirely avoid pyrometallurgical operations. I have now discovered such a process which overcomes the disadvantages of prior nonpyrometallurgical processes in that means are provided for the recovery and reuse of practically all of the chemical reagents employed, thus minimizing environmental pollution problems and improving the economic disadvantages of such prior processes.

In the drawings:

FIG. 1 is a much simplified overall process flowsheet illustrating my cyclic integrated process and particularly identifying the three principal stages thereof;

FIG. 2 is a more detailed flowsheet illustrating the operations of stage 1;

FIG. 3 is a more detailed flowsheet illustrating the operations of stage 2; and

FIG. 4 is a more detailed flowsheet illustrating the operations of stage 3.

Each stage of my process will be discussed in detail below but, for the purpose of clarity, the overall process will first be briefly reviewed.

THE OVERALL PROCESS

Referring to FIG. 1, it will be noticed that my process consists of three general stages—stage 1, which involves the preparation of a pregnant liquor by dissolving copper values from an appropriate copper source 11 by reaction with a mineral acid 12. The pregnant liquor 13 is then treated in stage 2 with hydrogen sulfide 14 to precipitate the copper values from the pregnant liquor, forming a solid copper sulfide 15. The mother liquor is preferably treated to separate the mineral acid content 16 which is then recycled to the stage 1 pregnant liquor preparation step. The copper sulfide 15 is then reduced in stage 3 by means of contact at an elevated temperature with a reducing gas 17 such as hydrogen, methane, carbon monoxide or mixtures thereof. If the reducing gas 17 contains components which react during the reduction of the copper sulfide 15 to produce elemental hydrogen gas, this byproduct will be recycled along with the hydrogen sulfide 14 to the precipitation step of stage 2 where it will be separated from the hydrogen sulfide, forming a byproduct hydrogen stream 18 which is preferably recycled to the reduction step of stage 3. The resultant copper metal product 19 may then be melted and formed into various commercially desired shapes such as wire bars, etc.

As will be apparent to those skilled in the art, the chemistry of each of the reactions involved is well known. Assuming the copper values are derived from copper sulfide ores, the reaction in the pregnant liquor preparation step (stage 1) is:

1. $Cu_2S + 2H_2SO_4 \rightarrow 2CuSO_4 + S° + 2H_2\uparrow$ 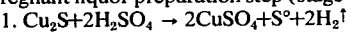

The reaction involved in the precipitation of the copper sulfide from the pregnant liquor in stage 2 is:

2. $CuSO_4 + H_2S \rightarrow CuS + H_2SO_4$ 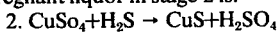

The reduction of the copper sulfide in stage 3 proceeds according to the following reaction:

(3)
$$CuS + H_2 \xrightarrow{\Delta} H_2S\uparrow + Cu°$$
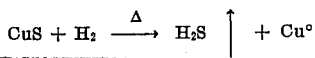

However, heretofore, these reactions have not been combined in such a manner as to provide an overall cyclic integrated process which involves the recovery and regeneration of the various reagents employed.

BRIEF DESCRIPTION OF THE PROCESS

Briefly, I provide an overall cyclic integrated process for the production of copper metal. The source of the copper values may be copper ores, copper ore concentrates, cement copper or, alternatively, the features of my invention may be embodied in a process in which the starting material is any solution of soluble copper salts of mineral acids. For purposes of illustration, it will be assumed that the source of copper contains copper values in the form of copper sulfides or copper-iron sulfides plus gangue materials, illustratively alumina and silica. The copper source is first contacted with a mineral acid, preferably sulfuric acid at a temperature of from about 70° to about 200° C., especially in the range 100°–150° C., preferably at least above 120° C. The temperature preferably is maintained above 120° C. in order that any elemental sulfur formed during the solution reaction will be maintained in a molten liquid condition. The contacting of the copper source with the mineral acid is continued for a length of time sufficient to dissolve the copper values, forming a reaction mixture containing a liquid phase and a solid phase. The liquid phase includes the soluble copper salts of the mineral acid, soluble iron salts of the mineral acid derived from iron in the gangue ore material and, if the solution reaction is carried out at a temperature above 120° C., the liquid phase will contain molten liquid sulfur. The solid phase includes the remainder of the gangue material.

After taking the copper values into solution, the liquid phase of the reaction mixture is separated from the solid phase. This operation, illustratively by filtration or any other suitable physical separation technique such as decantation, centrifugation, or the like, is conducted at a temperature at least above 120° C. in order to maintain the sulfur in a molten liquid condition. After the liquid phase of the reaction mixture has been separated from the solid phase, the liquid phase is cooled to a temperature below 120° C., causing the liquid sulfur to solidity, forming a suspension of solid elemental sulfur in the pregnant liquor. The pregnant liquor contains the copper and iron salts in solution.

The solid elemental sulfur is separated from the pregnant liquor by any conventional means of mechanical separation, i.e., by filtration, centrifugation or the like.

In stage 2 of my process, the pregnant liquor containing the dissolved iron and copper salts, and which may also contain other soluble trace metal salt impurities, is treated with a precipitating gas such as hydrogen sulfide or a mixture of hydrogen and hydrogen sulfide at an elevated temperature, for example, in the range of from about 70° to about 90° C. The reaction between the precipitating gas, preferably hydrogen sulfide, causes metals of the copper-arsenic group to precipitate as the insoluble sulfides thereof. If the precipitating gas included hydrogen, it will be separated from the hydrogen sulfide. The liquid phase remaining, i.e., the mother liquor, contains dilute sulfuric acid and the soluble iron salts ;issolved therein. As used herein, the term "metals of the copper-arsenic group" shall means those metals which are commonly identified in standard quantitative analysis reference sources as those metals which are precipitated by hydrogen sulfide in acidic solutions. For example, see *Quantitative Analysis and Chemical Equilibrium* by Hogness and Johnson (Holt Publishers, 3rd ed., 1947, pages 337 et seq.). As will be appreciated by those skilled in the art, some of the copper sources which might be employed in the practice of my invention may not contain any or all of the impurity metals included in this definition of the copper-arsenic group except, of course, all of the pregnant liquors produced in accordance with my invention will contain copper. However, such of these impurities as may be present will be precipitated along with the copper sulfide. The precipitated sulfides, principally copper sulfide, are separated from the precipitation reaction mixture and dried to produce a powdered copper sulfide intermediate product. This intermediate product is then contacted at a temperature of at least about 600° C. with a gaseous reductant. The gaseous reductant may, illustratively, be hydrogen, methane (either pure or in a natural gas), or mixtures of hydrogen and carbon monoxide produced by reforming natural gas or other hydrocarbons, such as illustratively, propane, butane, and the like, according to art-recognized techniques. The gaseous reductant is contacted with the copper sulfide intermediate product for a length of time sufficient to reduce the copper sulfide, forming the final copper metal product. A byproduct consisting of a gas which may be either hydrogen sulfide or a mixture of hydrogen sulfide and hydrogen is produced during the reduction of the copper sulfide. This byproduct gas is recycled to the sulfide reduction step of stage 2 to precipitate further quantities of copper sulfide. If the gaseous byproduct contains hydrogen, it ill be separated from the hydrogen sulfide in the precipitation step and is preferably recycled to the reduction step of stage 3. The mother liquor from the precipitation step of stage 2, containing sulfuric acid, is preferably treated to separate the sulfuric acid therefrom which is recycled to the pregnant liquor preparation step of stage 1 to dissolve additional copper and form the soluble copper sulfate contained in the pregnant liquor.

DETAILED DESCRIPTION—STAGE 1

Referring to FIG. 2, which illustrates in greater detail the operations involved in stage 1 of my process, the copper ore or concentrate 21, or optionally cement copper 22 which may contain from 60–95 percent Cu, is contacted in an appropriate reactor such as a stirred tank with a mineral acid 23. The mineral acid is preferably sulfuric acid although, as will be apparent to those skilled in the art, any other mineral acid such as nitric acid or hydrochloric acid could be employed, as the objective is to form a soluble copper salt in the pregnant liquor. The concentration of the mineral acid is not highly critical and may, illustratively, vary from 10 percent to as high as 100 percent. Obviously, if a 100 percent sulfuric acid solution reagent is employed, it will be necessary to dilute the reaction mixture with sufficient water to solubilize the copper sulfate. I preferably employ an approximately 90 percent solution of sulfuric acid and sufficient additional water to dissolve all of the copper sulfate formed. The dissolution reaction which forms the pregnant liquor is preferably carried out at an elevated temperature, for example from about 70° to about 200° C., preferably in the range 100°–150° C. In the preferred embodiment, I conduct this step at a temperature at least above 120° C. After the copper values have been extracted from the copper sources 21 or 22 to form the pregnant liquor, the reaction mixture 24 is then subjected to any appropriate liquid-solid separation procedure such as filtration, decantation, or the like, to separate the gangue material 25 from the pregnant liquor 26. It is preferred to conduct this separation step at a temperature greater than 120° C. in order to maintain any elemental sulfur present in the molten liquid state. The hot pregnant liquor 26 is then cooled, for example, to approximately 100°–115° C., which causes the sulfur to solidify and form a suspension in the pregnant liquor. The pregnant liquor containing the sulfur suspension 27 is then again subjected to any appropriate liquid-solid separation procedure such as filtration or centrifugation to separate he elemental sulfur 28 as a valuable byproduct from the pregnant liquor 29 which is then subjected to the procedures of stage 2.

DETAILED DESCRIPTION—STAGE 2

Referring to FIG. 3, the pregnant liquor 29 from stage 1 is contacted in an appropriate reaction vessel with a precipitating gas 31 produced in the stage 3 reduction step. As previously explained, the reaction in the stage 3 reduction step may involve the use of various types of reducing gases and, depending upon the particular gases employed, the composition of the precipitating gas 31 may vary from that of practically pure hydrogen sulfide to mixtures of hydrogen sulfide and elemental hydrogen. If the precipitating gas 31 contains hydrogen, it will be separated in the precipitation reaction and may be recycled as a stream 32 to the stage 3 reduction step. The precipitation of the copper values from the pregnant liquor (along with trace metal impurity sulfides of the copper-arsenic group, if present) causes the formation of a precipitation mixture 33 which can then be subjected to an appropriate solid-liquid separation procedure such as filtration. The mother liquor 34 and wash waters 44 from stage 3 are preferably treated to separate the sulfuric acid therein which may then be recycled to the pregnant liquor preparation step of stage 1. In a presently preferred embodiment, the combined wash waters 44 and mother liquor 34 are subjected to thermal decomposition by boiling, producing a stream of water vapor and sulfur trioxide 16 which, in turn, combine to form the sulfuric acid recycle stream 16 to stage 1. The residual iron oxides 39 of the thermal decomposition step may be either discarded or treated according to art-recognized procedures to produce elemental iron. In an optional embodiment of the invention, the wash waters 44 from stage 3, instead of being combined with the mother liquor 34, may be employed as the diluting water employed to assure complete solution of the soluble metal salts formed in the stage 1 dissolution step. The solid copper sulfide 35 (containing sulfides of other trace metal impurities, if present) is then subjected to the reduction procedures of stage 3. Optionally, as indicated by the dashed line 36, the trace impurity metals other than copper of the copper-arsenic group in the form of their respective sulfides, can be selectively extracted by reaction with ammonium polysulfide 37 to form a solution of the trace metal impurity salts 38 which can be physically separated from the insoluble copper sulfide 35a. The decision as to whether such optional selective extraction procedures should be employed will depend, of course, upon the concentration of the impurities and upon economic factors such as the value of the trace metals as separate byproducts of the process. For example, if the concentration level is sufficient, it may be highly attractive from the economic standpoint to extract and recover the molybdenum impurities. If the arsenic impurity level in the copper sulfide intermediate product 35 is sufficiently high to cause undue contamination of the final copper metal product, the optional selective extraction step would be employed to avoid the necessity for further purification of the copper product of stage 3.

DETAILED DESCRIPTION—STAGE 3

The solid copper sulfide 35 or 35a from stage 2 is subjected to the procedures illustrated in FIG. 4 (stage 3). The solid copper sulfide intermediate product 35 or 35a is preferably repulped and washed with water 41, preferably containing $H_2S$, and the repulped copper sulfide 42 is then subjected to appropriate liquid-solid separation procedures such as filtration or decantation to produce a washed copper sulfide intermediate product 43 and a stream of wash water 44 which, as described above, may be optionally subjected to thermal decomposition to recover $SO_3$ which may be recycled to the dissolving step of stage 1. The washed copper sulfide product 43 is then dried, for example by spray drying procedures, at temperatures in the range of from about 100°–350° C. to produce a dried, powdery copper sulfide intermediate product 44. This dried, powdery copper sulfide product 44 is then intimately contacted at an elevated temperature, for example in excess of 650° C., preferably in the range of about 650°–700° C., with a reductant gas 45 which may be hydrogen, methane (either pure or in a natural gas stream) or a reformed natural gas product containing hydrogen and carbon monoxide prepared in accordance with art-recognized techniques. According to a preferred embodiment, a hydrogen stream 32 obtained as a byproduct of the stage 2 precipitation step is recycled from stage 2 and combined with the stream 46 to augment the reductant gas stream 45. The reduction step produces a byproduct gas stream 47 which, according to the exact composition of the reductant gas 45, may be either substantially pure hydrogen sulfide or a mixture which includes hydrogen sulfide and hydrogen. The precipitating gas stream byproduct 47 is recycled to the stage 2 precipitation step for use in precipitating additional quantities of copper sulfide and other copper-arsenic group metals, if present. The final metallic copper product 48 may be then subjected to further melting and casting procedures to produce commercially saleable shapes such as wire bars, etc.

The following working example will serve to further illustrate to those skilled in the art how to practice the invention and to identify the presently preferred embodiments thereof. Such example is not intended as an indication of limitation on the scope of the invention, but, rather, as illustrations of the various preferred embodiments thereof such that persons skilled in the art can understand and practice the invention without undue experimentation.

EXAMPLE

One hundred tons per day of a concentrate of chalcocite ore, the concentrate containing approximately 30 percent copper, is treated according to the following procedures to produce approximately 28 tons per day of copper metal product.

The concentrate is charged in 25-ton batches into a stirred stainless steel ceramic-lined reaction vessel provided with a gas-fired burner for heating the contents. Forty tons of 93 percent (commercial grade) sulfuric acid are then introduced into the reactor and agitation of the concentrate with the acid is continued for 5 hours until an assay of the washed solid residues in the reaction vessel indicate that approximately 95 percent of the copper values are extracted from the concentrate and converted to copper sulfate while the gases are reacted to reform sulfuric acid. At this point, 80 tons of water are added to the reaction vessel and agitation is continued until all soluble materials, including the solid copper sulfate, is entirely dissolved, forming the pregnant liquor. The temperature of the reaction mixture is continuously maintained at approximately 150° C. during the preparation of the pregnant liquor.

At this point, the contents of the reactor are pumped to a rotary vacuum filter provided with a Teflon (equivalent to 1/1 plain monofilament fiber) filter media to separate the insoluble gangue material from the pregnant liquor. During this filtering operation, the temperature of the reaction mixture remains above 120° C. such that the elemental sulfur in the reaction mixture remains in the liquid phase. The filtrate is passed through a water-jacketed cooling line which reduces the temperature of the pregnant liquor to approximately 110° C., causing the solidification of the molten sulfur, forming a suspension of finely divided elemental sulfur in the pregnant liquor. This suspension is filtered in a rotary filter through a Teflon media to separate approximately 7.5 tons of elemental sulfur, which is washed and recovered for sale as a valuable byproduct. Aliquot portions of the pregnant liquor from the sulfur filtration step are introduced into a series of four stirred, heated, sealed Teflon-lined steel precipitation reactors, each reactor provided with sparge pipes for the introduction of the precipitating gas. The precipitating gas is introduced into the first of the four reactors in large stoichiometric excess of that required to precipitate the copper values in the first reactor. The excess gas collected above the pregnant liquor in the first reactor is in turn conducted successively into each of the series of reactors until substantially all of the hydrogen sulfide gas is consumed by the reaction at the last of the series of reactors.

As the copper values in each successive precipitation reactor are completely converted to copper sulfide, the precipitating gas flow to that particular reactor is interrupted and is shifted to the next successive reactor. Meanwhile, the copper sulfide precipitate in the first reactor is removed and additional fresh pregnant liquor from the next succeeding batch is introduced into the reactor and this procedure is repeated until all of the pregnant liquor has been subjected to the precipitation reaction.

During the precipitation reaction, the temperature of the contents of the reactors is maintained at about 90° C. The precipitating gas consists of a mixture of hydrogen sulfide and hydrogen in the ratio of 20 mols $H_2$/mol $H_2S$ and is introduced into the series of precipitating reactors in the amount of 1.5 pounds of $H_2S$ per pound of copper in the pregnant liquor in the first reactor. The hydrogen content in the precipitating gas is recovered above the pregnant liquor in the last of the series of precipitation reactors and is recycled for use as reductant gas as explained below.

The contents of each of the precipitation reactors is filtered as described above to separate the solids from the mother liquor. The solids are washed with water containing 1 percent dissolved $H_2S$ and the washed solids, containing 0.1 percent arsenic as $As_2S_3$, are subjected to the optional selective extraction step illustrated in FIG. 3 of the drawings, as follows. The washed solids are repulped with 1,000 pounds of a 1:1 solution of ammonium polysulfide in a sealed, stirred reaction vessel. Agitation of the repulped solids is continued for 20 minutes at a temperature of 60° C., after which the wash liquid is separated from the solids by filtration. The ammonium polysulfide selectively extracts the $As_2S_3$ from the solids, leaving a substantially pure solid residue of copper sulfide.

The mother liquor from the precipitation reactors, after separation from the solids, is heated to boiling to thermally decompose the sulfuric acid content, yielding water vapor and sulfur trioxide which, when cooled, are condensed to form sulfuric acid which is recycled to the concentrate leaching step for dissolving additional copper values from the ore concentrate.

The copper sulfide intermediate product obtained after the selective extraction of the arsenic impurity is repulped and washed with water containing 1 percent dissolved $H_2S$. The wash waters, after separation from the copper sulfide solids in a rotary vacuum filter, are combined with the mother liquor from the precipitation reactors for recovery and recycle of sulfuric acid. The washed copper sulfide intermediate product is spray-dried at an air temperature of 300° C. to produce a dried, powdery copper sulfide intermediate product of predominantly −325 mesh. The dried, powdery copper sulfide intermediate product is conveyed into reduction reactor in which the powdered product is centrifugally dispersed into the top of the reactor and then falls by gravity downwardly, contacting a countercurrent stream of hot reductant gas moving upwardly through the reactor. Certain of the reduction reaction products, including unreacted reductant gas and a portion of the unreduced copper sulfide entrained in the gas and a portion of the copper powder product, are collected at the top of the reactor and passed through a three-stage cyclone separator system. The solids collected in the cyclone separators are recycled to the centrifugal distribution head in the reduction reactor and the gases separated therefrom are reheated and reintroduced into the bottom of the reduction reactor. The temperature of the reductant gas mixture entering the bottom of the reduction reactor is maintained at approximately 700° C. The reduction reactor operation is continued as described above until all of the copper sulfide has been reduced to elemental copper. The gaseous byproduct consisting of the mixture of hydrogen and hydrogen sulfide described above is recycled to the copper sulfide precipitation reactors for use in precipitating additional quantities of solid copper sulfide intermediate product. The reduction reactor is initially charged with 0.5 pounds of substantially pure hydrogen gas per pound of copper sulfide intermediate product to be reduced.

The resultant copper product, predominantly −325-mesh particle size, analyzes 99.96 percent copper and is suitable for use in various powder metallurgy applications or may be melted and cast into conventional commercial shapes such as wire bars, etc.

Having fully described my invention and the presently preferred embodiment thereof, I claim:

1. A cyclic integrated process for the production of copper metal from a source of copper selected from the class consisting of copper ores, copper ore concentrates and cement copper, which copper source contains copper values and gangue materials, which process comprises in combination the steps of:

a. contacting said copper source at a temperature in the range 70° C. to 200° C. with a sulfuric acid for a length of time sufficient to dissolve the copper values therein, forming a reaction mixture containing
   a liquid phase which includes
      1. soluble copper salts of said mineral acid, and
      2. soluble iron salts of said mineral acid derived from said gangue material,
   a solid phase including the remainder of said gangue material, and
   elemental sulfur;
b. separating said liquid phase from said solid phase at a temperature of at least above 120° C.;
c. cooling said liquid phase to a temperature below 120° C. to form a suspension of solid elemental sulfur and a pregnant liquor containing said copper and iron salts in solution therein;
d. separating said solid elemental sulfur from said pregnant liquor;
e. contacting said pregnant liquor with a precipitating gas selected from the class consisting of hydrogen sulfide and mixtures which include hydrogen and hydrogen sulfide, at an elevated temperature, forming a precipitation reaction mixture including
   1. hydrogen gas, if the precipitating gas was a mixture of hydrogen and hydrogen sulfide,
   2. a liquid phase including sulfuric acid and said soluble iron salts dissolved therein, and
   3. a solid phase including precipitated sulfides of the metals of the copper-arsenic group;
f. separating said solid phase from said precipitation reaction mixture;
g. drying said solid phase to produce a powdered copper sulfide intermediate product;
h. contacting said powdered copper sulfide intermediate product at a temperature of at least about 650° C. with a gaseous reductant selected from the class consisting of hydrogen, methane and carbon monoxide for a length of time sufficient to
   1. reduce said copper sulfide intermediate product to the final copper product, and
   2. form a byproduct comprising a gas selected from the class consisting of hydrogen sulfide and a mixture which includes hydrogen sulfide and hydrogen; and
i. recycling said gaseous byproduct from said copper sulfide reduction step to said pregnant liquor reduction of step e.

2. Process of claim 1 in which hydrogen gas in the pregnant liquor precipitation step e is recycled to the copper sulfide reduction step h.

3. Process of claim 1 in which the liquid phase of step e is treated to separate sulfuric acid therefrom and in which said sulfuric acid is recycled to the copper solution step a.

* * * * *